United States Patent Office 2,938,030
Patented May 24, 1960

2,938,030

NEW STEROIDS SUBSTITUTED BY A HETERO-CYCLIC NITROGEN-CONTAINING RING IN 17-POSITION

Karl Hoffmann and Jules Heer, Binningen, Switzerland, assignors to Ciba Pharmaceutical Products Inc., Summit, N.J.

No Drawing. Filed Oct. 1, 1957, Ser. No. 687,369

Claims priority, application Switzerland Oct. 3, 1956

9 Claims. (Cl. 260—239.5)

This invention relates to 17-oxy-17-R-steroids, where R represents a pyridyl or piperidyl radical, their esters and salts thereof.

More particularly the invention concerns steroids substituted in the 17-position as indicated above which belong to the androstane or testane series. These steroids may be homo- and/or nor-compounds and may be saturated or unsaturated. Thus they may represent correspondingly 17-substituted oestrane compounds.

The new compounds may contain substituents. Thus they may be substituted in the steroid portion by free or esterified hydroxyl groups or free or functionally converted oxo groups or by halogen atoms. The piperidyl nitrogen atom may be substituted by an alkyl, acyl or aralkyl radical. As esterified hydroxyl groups there are concerned more particularly hydroxyl groups esterified with an aliphatic alicyclic, araliphatic, aromatic or heterocyclic carboxylic acid, thion-carboxylic acid, or thiolcarboxylic acid or sulfonic acid with 1–20 C-atoms. As acids there may be mentioned unsubstituted, or halogen-substituted fatty acids such as, for example, acetic acid, chloracetic acid, trifluoracetic acid, propionic acid, butyric acids, valeric acids, trimethylacetic acid, diethylacetic acid, caproic acids, oenanthic acids, capric acids, palmitic acid, undecanic acid, undecylenic acid, crotonic acid, oxalic acid, succinic acid, pimelic acid, maleic acid, lactic acid or carbamic acid, β-cyclopentyl-propionic acid, benzoic acid, phenylacetic acid, cyclohexylacetic acid, furane-2-carboxylic acid, methane sulfonic acid and toluene sulfonic acids. The hydroxyl group in the 17-position may also be esterified with one of the aforesaid acids, for example, lower fatty acids, e.g. acetic acid. A functionally converted oxo group is more especially a ketalised oxo group, for example, the ethylene-dioxy group.

As N-substituents lower alkyl radical or acyl-radicals of lower fatty acids, benzoic acids or simple aryl-fatty acids, e.g. the methyl group or acetyl group are preferred.

The new compounds possess valuable pharmacological properties. Thus, they possess cardiac activity particularly a coronary dilation effect and can therefore be used as medicaments.

Especially valuable are the oestrane and androstane compounds of the kind defined above, which contain in the 3-position a free or esterified hydroxyl group or a free or functionally converted oxo group. The compounds may contain further double bonds, the androstane compounds, for example, may contain a double bond starting from the 5-carbon atom. The pyridyl or piperidyl radicals are preferably connected in their 2-positions to the steroid nucleus. Specific and preferred embodiments of the invention are, for example, Δ⁵-

3β:17β-dihydroxy-17α-pyridyl-(2')-androstane of the formula

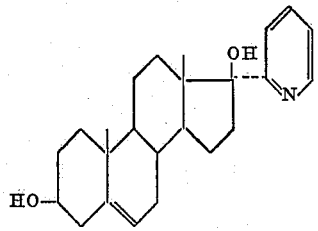

and also acetyl derivatives thereof, 17α-pyridyl-(2')-oestradiol of the formula

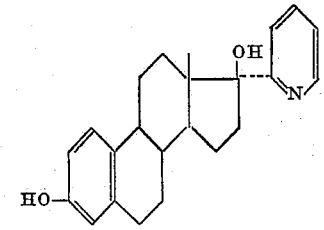

and acetyl derivatives thereof, 3β:17β-dihydroxy-17α-piperidyl-(2')-androstane of the formula

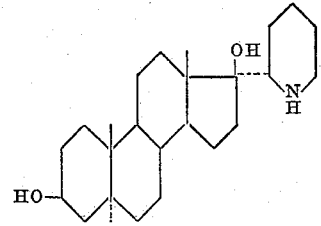

and also acetyl compounds thereof, and the N-methyl derivatives, and 17α-pyridyl-(2')-androstane-17-ol-3-one of the formula

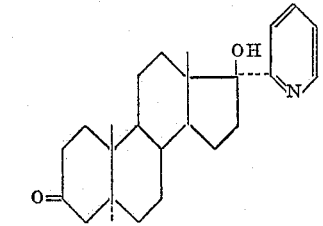

and the salts thereof.

The invention also provides a process for the manufacture of the aforesaid new 17-oxy-17-R-steroids, wherein a 17-oxo-steroid, especially one which contains in the 3-position a free or esterified hydroxyl group or a functionally converted oxo group, is reacted with a pyridyl-lithium compound, preferably pyridyl-(2)-lithium. The 17-oxy-17-pyridyl compound so obtained may be treated with an agent capable of reducing the pyridine ring. At any stage in the process and in any desired order of succession the compounds so obtained may be treated so as to introduce a double bond therein or to saturate a double bond therein, to esterify a free hydroxyl or to functionally convert an oxo group, to oxidise a free hydroxyl group to an oxo group, to reduce an oxo group to a hydroxyl group, to remove or introduce a hydroxyl or oxo group and to liberate an esterified hydroxyl group or a functionally converted oxo group. A product so obtained may be N-substituted or an N-acylated compound hydrolysed.

A base so obtained may be converted into a salt thereof or a salt so obtained converted into the free base.

The reaction with the pyridyl-lithium compound, especially pyridyl-(2)-lithium, is carried out in the usual manner, for example, in an inert diluent, and the reaction mixture is worked up in the customary manner, for example, in an acid medium. When acyloxy-groups are present in the molecule they may be split up to form free hydroxyl groups.

As agents capable of reducing the pyridine ring there may be mentioned hydrogen in the presence of a catalyst, preferably a noble metal catalyst, such as platinum, or nickel or copper chromite, and also nascent hydrogen produced, for example, by treating sodium with an alcohol, for example, butanol. Depending on the choice of the reaction conditions double bonds present in the steroid molecule are saturated.

The reactions which may be carried out, if desired, in the steroid residue or at the nitrogen atom, such as hydrolysis of an acyloxy group, oxidation of a hydroxyl group to an oxo group, N-acylation, N-alkylation, hydrolysis of an N-acyl group, the introduction or saturation of a double bond, etc. are carried out by methods in themselves known. Other groups not intended to undergo reaction may be protected.

The new compounds are obtained, depending on the reaction conditions, in the form of their free amine or salts thereof. The free bases can be converted in the usual manner into their therapeutically useful acid addition salts, and the latter can be converted in known manner into the free bases. As salts there may be mentioned those of inorganic or organic acids, for example, hydrohalic acids, sulfuric acid, nitric acid, phosphoric acid, thiocyanic acid, acetic acid, propionic acid, oxalic acid, malonic acid, succinic acid, maleic acid, methane sulfonic acid, ethane sulfonic acid, oxyethane sulfonic acid, benzene or toluene sulfonic acid or a therapeutically active acid.

The new compounds can be used as medicaments, for example, in the form of pharmaceutical preparations which contain the compound or a salt thereof in admixture with a pharmaceutical organic or inorganic carrier suitable for enteral or parenteral administration. For making the carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or another carrier known for medicaments. The pharmaceutical preparations may be in the form, for example, of tablets, dragees or in liquid form as solutions, suspensions or emulsions. If desired, they may be sterilised and/or may contain auxiliary substances, such as preserving, stabilising, wetting or emulsifying agents, salts for regulating the osmotic pressure or buffers. They may also contain other therapeutically active substances.

The starting materials are known or can be made by methods in themselves known.

The following examples illustrate the invention:

*Example 1*

A solution of 33 grams of $\Delta^5$-3$\beta$-acetoxy-androstene-17-one in 200 cc. of benzene are run into a pyridyl-lithium solution, prepared from 6.4 grams of lithium in 200 cc. of ether, 74 grams of bromobenzene in 200 cc. of ether and 74 grams of bromopyridine in 200 cc. of benzene, in the course of 60 minutes at −30 to −40° C. When the reaction is finished 2 N-hydrochloric acid is added and, if desired, methanol is added to complete the dissolution, and the base is precipitated from the aqueous solution with aqueous ammonia. The crude base so obtained is taken up in a solution of 200 cc. of ether and 50 cc. of isopropyl ether, and crystals are formed after allowing the mixture to stand for a short time. The $\Delta^5$-3$\beta$:17$\alpha$-dihydroxy-17$\alpha$-pyridyl-(2')-androstene so obtained melts at 199–201° C. after recrystallization from a mixture of acetone and methanol, and has the specific rotation $[\alpha]_D^{23} = 53° \pm 4°$ (c=0.97 in chloroform).

Acetylation in the usual manner in a mixture of pyridine and acetic anhydride at 24° C. yields the 3-monoacetyl derivative melting at 146–147° C.

The 3:17-diacetyl-derivative is obtained by heating a solution of 400 milligrams of $\Delta^5$-3$\beta$:17$\beta$-dihydroxy-17$\alpha$-pyridyl-(2')-androstene in 10 cc. of pyridine and 2 cc. of acetic anhydride for 10 hours at a bath temperature of 150° C. By working up in the usual manner there is obtained a crude product from which there is obtained by fractional crystallization, in addition to a small amount of the 3 - acetate, $\Delta^5$-3$\beta$:17$\beta$-diacetoxy-17$\alpha$-pyridyl-(2')-androstene melting at 204–206° C. and having the specific rotation $[\alpha]_D^{24} = -8° \pm 4°$ (c=0.961 in alcohol).

*Example 2*

A solution of 13.62 grams of $\Delta^5$-androstene-dione-3-enol-ethyl ether in 140 cc. of benzene is added dropwise at −35° C. to a pyridyl-lithium solution, prepared from 1.6 grams of lithium under 200 cc. of ether, 18 grams of bromobenzene in 270 cc. of ether and 18 grams of 2-bromopyridine in 100 cc. of ether. By working up in the manner described in Example 1 there is obtained 17$\alpha$-pyridyl-(2')-testosterone, which crystallises from acetone in the form of short rods melting at 193–195° C. and having the specific rotation $[\alpha]_D^{23} = 81° \pm 4°$ (c=1.1844 in alcohol).

*Example 3*

A solution of 2.7 grams of oestrone in 80 cc. of dioxane is added at −5° C. to a pyridyl-lithium solution, prepared from 0.42 gram of lithium, 5 grams of bromobenzene and 4.8 grams of 2-bromopyridine in 40 cc. of ether. After allowing the mixture to stand overnight it is worked up as described in Example 1, and there is obtained in addition to oestrone, basic constituents which, by chromatographic purification over 20 grams of aluminum oxide yield 17$\alpha$-pyridyl-(2')-oestradiol melting at 124–125° C., and having the specific rotation $[\alpha]_D^{23} = +54° \pm 4°$ (c=0.84 in alcohol).

*Example 4*

A solution of 3.67 grams of $\Delta^5$-3$\beta$:17$\beta$-dihydroxy-17$\alpha$-pyridyl-(2')-androstene in 72 cc. of glacial acetic acid is agitated with 300 milligrams of a platinum catalyst at 50° C. in hydrogen. In the course of 2 hours the quantity of hydrogen calculated for 4 mols (927 cc.) is taken up. After filtration and evaporation of the reaction solution, water is added to the residue and then the clear solution is treated with dilute aqueous ammonia. The precipitated crude base is recrystallised from acetone, whereby 3$\beta$:17$\beta$-dihydroxy-17$\alpha$-piperidyl-(2')-androstane is obtained in the form of needles melting at 192–194° C.

The hydrochloride of the latter compound, obtained by means of alcoholic hydrochloric acid, crystallises from ethyl acetate in the form of handsome needles melting above 260° C.

5 grams of 3$\beta$:17$\beta$-dihydroxy-17$\alpha$-piperidyl-(2')-androstane are acetylated in 20 cc. of pyridine with 10 cc. of acetic anhydride. The N-acetyl-3$\beta$-acetoxy-17$\beta$-hydroxy-17$\alpha$-piperidyl-(2')-androstane so obtained melts at 220–223° C. after crystallisation from methanol, and has the specific rotation $[\alpha]_D^{23} = +6° \pm 4°$ (c=1.139 in chloroform).

5 grams of the latter diacetyl-compound are heated on the water bath for 2 hours in a solution of 1 gram of potassium hydroxide in 50 cc. of methanol and 10 cc. of water. The methanol is then distilled off in vacuo, dilute hydrochloric acid is added to the residue, and the hydrolysis product is filtered off with suction.

The lustrous lamellae of N-acetyl-3β:17β-dihydroxy-17α-piperidyl-(2')-androstane obtained by recrystallisation from alcohol melt at 205° C.

3 grams of 3β:17β-dihydroxy-17α-piperidyl-(2')-androstane are heated at 120° C. (bath temperature) for 4 hours in a solution of 3 cc. of formaldehyde solution of 40 percent strength and 3 cc. of formic acid. The crude base is isolated by a customary method and converted into its hydrochloride. The hydrochloride of N-methyl-3β:17β-dihydroxy-17α-piperidyl-(2')-androstane so obtained crystallises from a mixture of methanol and ethyl acetate in the form of needles melting above 260° C.

*Example 5*

14.6 grams of 17α-pyridyl-(2')-testosterone in 400 cc. of rectified spirit are agitated with 800 milligrams of 10 percent palladium-charcoal under hydrogen. In the course of 5½ hours at 24° C. 901 cc. of hydrogen, corresponding to 2 mols, are taken up. By working up in the usual manner there are obtained 15 grams of a resinous crude product, which is crystallised from a mixture of benzene and petroleum ether. The crystallisate melts at 98–104° C., accompanied by the evolution of benzene of crystallisation. After cautiously drying the product in vacuo there is obtained a crystallisate melting at 146–148° C., which is 17α-pyridyl-(2'-)-androstane-17-ol-3-one, having the specific rotation $$[\alpha]_D^{26} = +41° \pm 4°$$

(c=1.177 in alcohol).

*Example 6*

A solution of 1.25 grams of N-acetyl-3β:17β-dihydroxy-17α-piperidyl-(2')-androstane in 150 cc. of acetone is cautiously added to 2.5 cc. of Killianis reagent (5 grams of chromium trioxide in 40 cc. of water and 5 cc. of concentrated sulfuric acid). A greenish precipitate is formed. The reaction mixture is allowed to stand for 10 minutes at 24° C., and it is then evaporated somewhat in vacuo and water is cautiously added. In this manner N-acetyl 17β-hydroxy-17α-piperidyl-(2')-androstane-3-one precipitates out in the form of small lamellae melting above 240° C.

200 milligrams of the latter N-acetyl-compound are heated in 4 cc. of 2 N-alcoholic hydrochloric acid for 10 minutes on a water bath, and then the mixture is evaporated. The residue consists of the hydrochloride of 17β-hydroxy-17α-piperidyl-(2')-androstane-3-one.

What is claimed is:
1. 17α-pyridyl-(2')-testosterone.
2. Therapeutically useful acid addition salts of the compound claimed in claim 1.
3. 17α-pyridyl-(2')-oestradiol.
4. Therapeutically useful acid addition salts of the compound claimed in claim 3.
5. 17β-hydroxy-17α-pyridyl-(2')-androstane-3-one.
6. Therapeutically useful acid addition salts of the compound claimed in claim 5.
7. 17β-hydroxy-17α-piperidyl-(2')-androstane-3-one.
8. Therapeutically useful acid addition salts of the compound claimed in claim 7.
9. Acetic acid esters of the compound claimed in claim 7.

References Cited in the file of this patent

UNITED STATES PATENTS

| 2,853,487 | Goldberg et al. | Sept. 23, 1958 |

FOREIGN PATENTS

| 511,454 | Belgium | June 14, 1952 |